United States Patent [19]
Kotler

[11] Patent Number: 4,605,118
[45] Date of Patent: Aug. 12, 1986

[54] RECLAIMING DEVICE

[76] Inventor: Richard G. Kotler, 10 Bevington Rd., Pittsburgh, Pa. 15221

[21] Appl. No.: 699,209

[22] Filed: Feb. 7, 1985

[51] Int. Cl.⁴ ............................................. B65G 17/36
[52] U.S. Cl. ..................... 198/509; 198/518; 198/640; 198/642; 37/190
[58] Field of Search ............... 37/190, 91, 189, 94; 198/509, 549, 307.1, 308.1, 638, 642, 703, 710, 198/518, 519, 640

[56] References Cited

U.S. PATENT DOCUMENTS

| | | | |
|---|---|---|---|
| 992,346 | 5/1911 | Fahey | 37/190 |
| 2,757,463 | 8/1956 | Kolbe | 198/518 X |
| 3,349,892 | 10/1967 | Barre | 198/518 X |
| 3,357,118 | 12/1967 | Taranov | 37/190 |
| 3,592,394 | 7/1971 | Sinden | 198/642 X |
| 3,731,408 | 5/1973 | Neal | 198/518 X |
| 3,746,150 | 7/1973 | Briggs | 198/316.1 X |
| 3,823,495 | 7/1974 | Robertson | 37/189 X |
| 3,915,286 | 10/1975 | Barre | |

FOREIGN PATENT DOCUMENTS

.30093  4/1914  United Kingdom ............... 198/509

Primary Examiner—Joseph E. Valenza
Assistant Examiner—Jonathan D. Holmes
Attorney, Agent, or Firm—Grigsby, Gaca & Davies

[57] ABSTRACT

A reclaiming wheel which has a pair of annular members mounted on an axle. A flexible belt is fitted between the peripheries of the annular members around part of their circumference. Scoops are attached to one or both of the annular members, projecting both axially and radially. As the wheel is rotated about the axle the scoops direct material to be reclaimed through openings in the annular member to which they are attached into the interior of the wheel. The material is held against the belt by centrifugal force and moves with the belt and wheel until it reaches the point at which the belt separates from the wheel. The material is then thrown from the wheel onto a conveyor.

5 Claims, 6 Drawing Figures

RECLAIMING DEVICE

BACKGROUND OF THE INVENTION

This invention relates to bulk material handling devices and, more particularly, to a rotatable wheel for reclaiming loose materials.

Coal, Ores, grains and other bulk materials are often stored in large, open piles. Such materials are sometimes also similarly heaped in the holds of ships or barges for transportation. In the past, material has been reclaimed from such piles by devices employing a series of buckets or scoops, mounted on a moving wheel or endless belt or chains, which dig material from the top or side of a pile, elevate the material to a point at or near the highest point of the path of motion and then discharge the material onto a moving conveyor belt or similar devices. Since the buckets or scoops often operate at the end of a boom, their weight is a major factor limiting the size and capacity of such devices.

In conventional bucket wheels, the material is discharged from the buckets or scoops by allowing it to fall by the force of gravity. The speed of such devices is limited by the time it takes to empty each bucket or scoop. At higher speeds, in addition to each bucket or scoop spending less time at the discharge position, increased centrifugal force tends to counteract gravity and actually slows the discharge of material.

Devices such as that described in U.S. Pat. No. 3,731,408 have been designed to operate at higher speeds by opening the scoops or buckets at the discharge point, thus allowing material to be discharged by the action of centrifugal force. Such devices have the disadvantage of requiring hinges, latches and other elements in the bucket or scoop that increase the weight and constitute points of wear and potential failure.

U.S. Pat. No. 3,357,118 describes a centrifugal discharge wheel excavator for open pit mining which employs open sided buckets. Those buckets utilize rubbing contact between the excavated material and the cut face to confine the material until it is lifted above the level of the face. After the material is lifted above the level of the face it is held in the bucket by a series of stationary retaining plates. Such a device is not well adapted to reclaiming loose material because the continual rubbing of the material against itself and the stationary plates causes increased power consumption and material degradation, and because the necessarily large clearances result in excessive leakage. In addition, irregularities in the top level of the stored material make it difficult to position the stationary retaining plates accurately.

Other centrifugal discharge designs have the buckets attached to a flexible member such as a chain or belt. These devices are designed to scoop up material as the buckets travel over a large diameter pulley which lessens centrifugal effects, elevate the buckets linearly which creates no centrifugal effect, and discharge the material as the buckets travel around a smaller diameter pulley which causes the centrifugal effect to be maximized. This design has several disadvantages: additional complexity involving many more moving parts than scoops that travel in a circular path; buckets which must be designed for both scooping material and discharging material through the same opening, thus disallowing optimal configuration for either action; and limitations in size and speed based on the relative diameters of the two pulleys.

SUMMARY OF THE INVENTION

In the present invention a wheel is provided which is comprised of two annular members spaced apart on a common axis. A number of scoops are disposed around one or both sides of the wheel to direct reclaimed material into the space between the annular members as the wheel rotates about the axis. An endless flexible belt moves with the wheel and seals the space between the two annular members around part of its periphery. The material between the annular members moves with the wheel and belt due to the combined effects of friction and centrifugal force. Plates may be provided between the annular members to urge the material along. At the desired point of discharge the belt is separated from the wheel so that the material is thrown onto a conveyor.

It is an object of this invention to provide a lightweight high-speed reclaiming wheel having a minimum number of moving parts.

It is a further object of this invention to provide a device that will minimize the energy required to reclaim a given amount of material.

Another object of this invention is to provide a reclaiming wheel that will discharge materials, particularly those having a tendency to stick to the device, by the force imparted by its rotation.

Still another object of this invention is to provide a reclaiming wheel having separate intake and discharge openings so that the configuration of each can be optimized for its particular function.

Other objects and purposes of the invention will be clear from the description of the preferred embodyment.

DESCRIPTION OF THE PREFERRED EMBODIMENT

Figure 1:
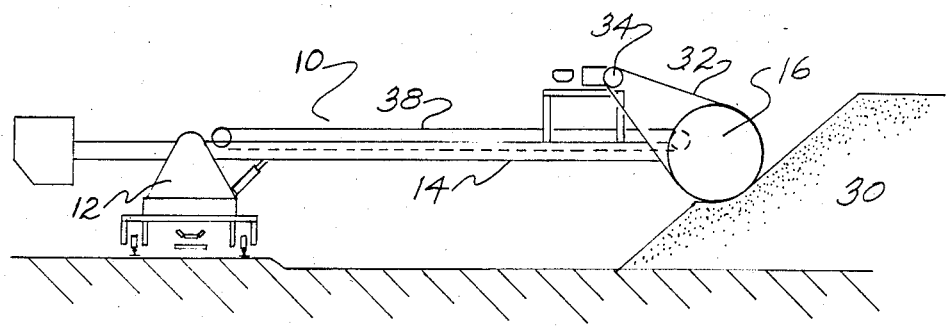
FIG. 1 is an overall elevation view of the reclaiming device.
Figure 2:
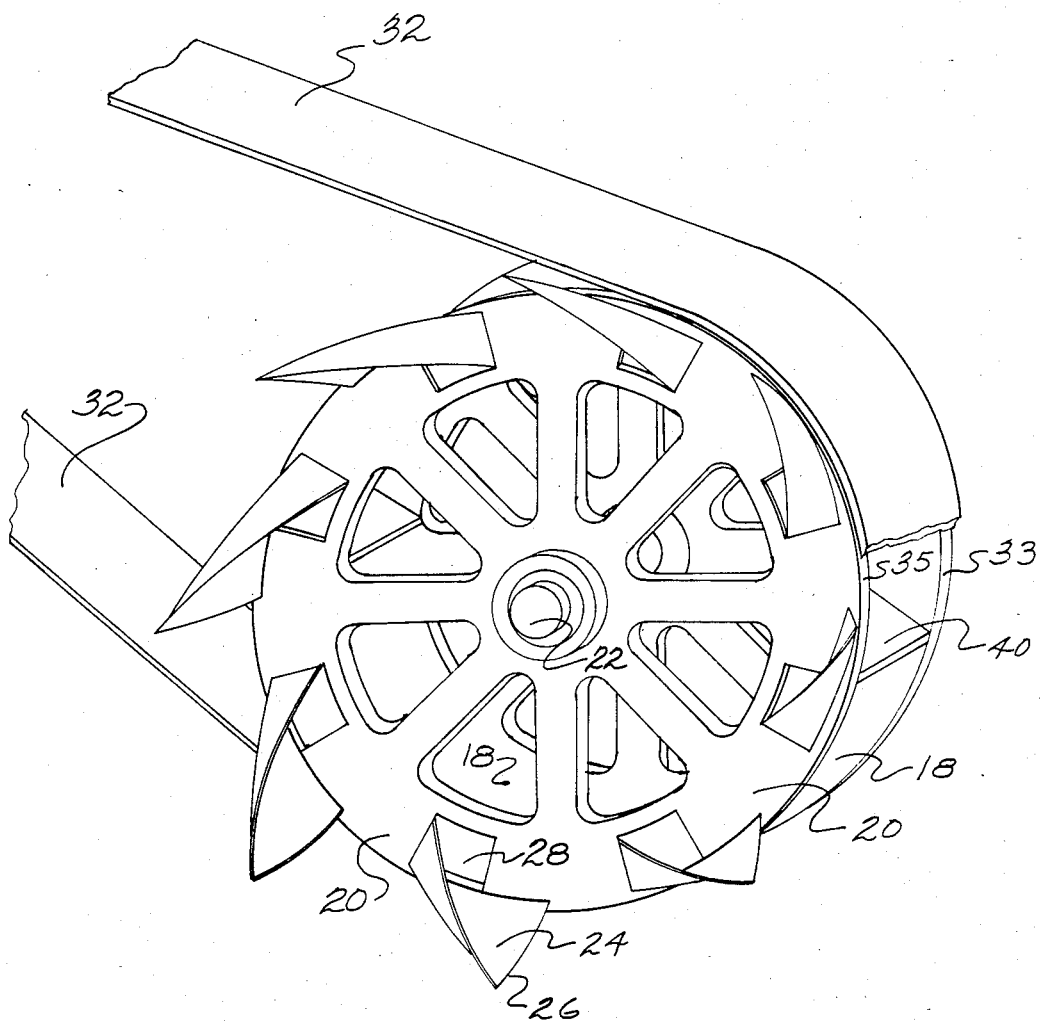
FIG. 2 is an isometric view of the reclaiming wheel and flexible belt.
Figure 3:
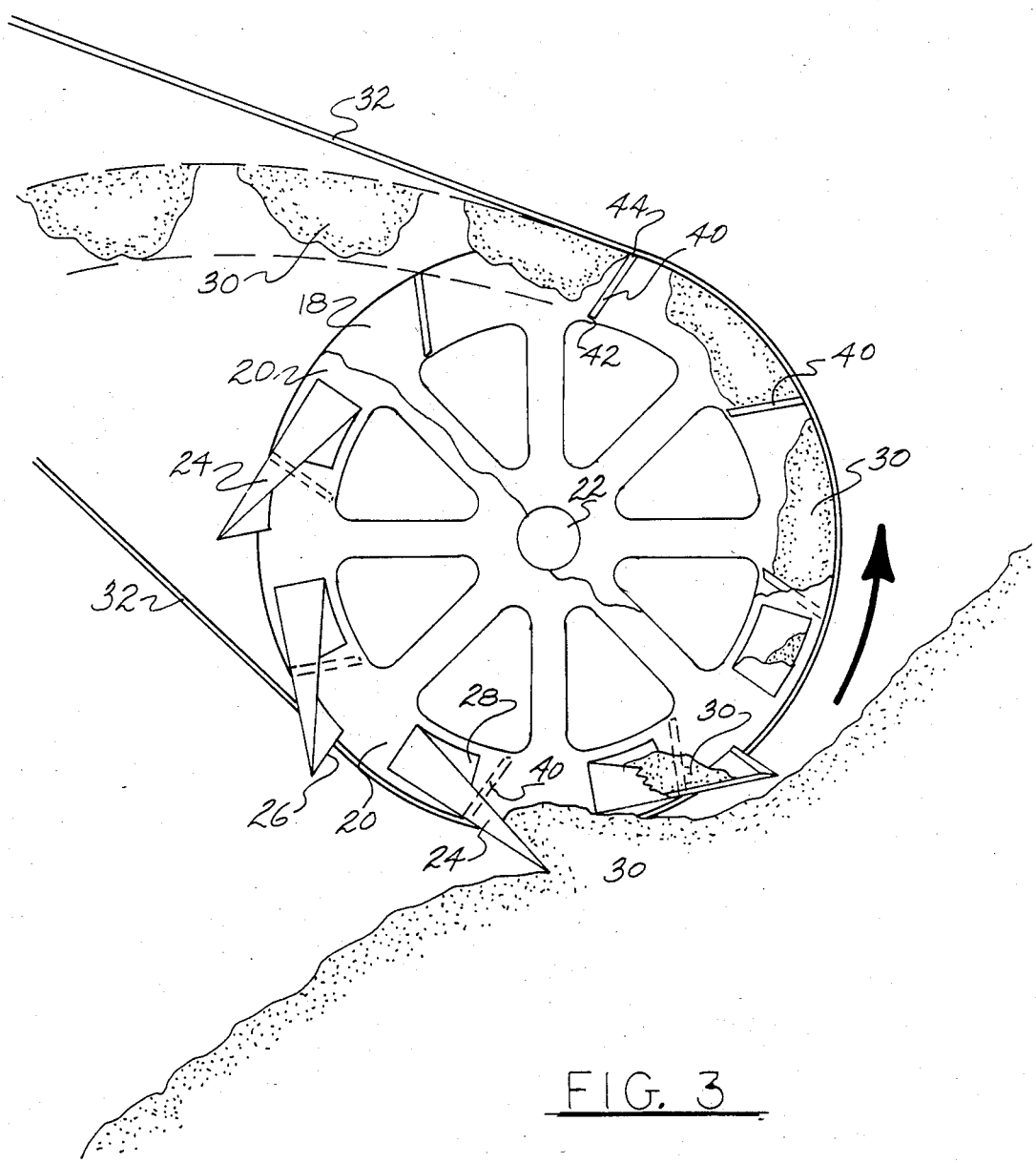
FIG. 3 is an elevation view of the reclaiming wheel and belt in operation.
Figure 5:
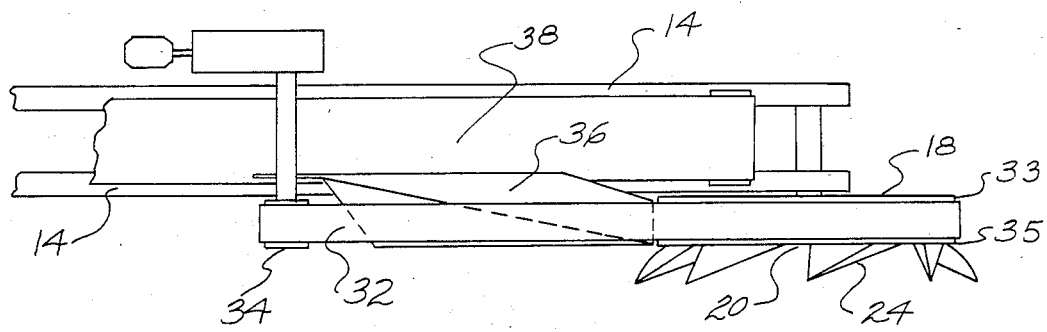
FIG. 5 is a plan view of the reclaiming wheel, belt and drive motor as attached to the boom with the associated chutework and conveyor.
Figure 4:
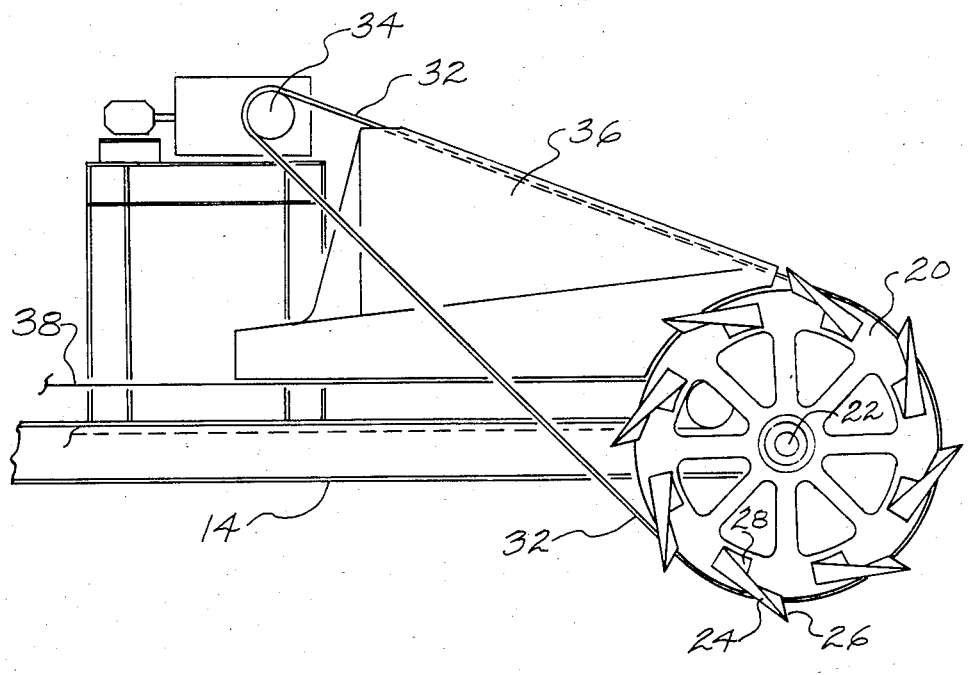
FIG. 4 is an elevation view of the reclaiming wheel, belt and drive motor as attached to the boom with the associated chutework and conveyor.

Referring to the drawings, FIG. 1 shows a reclaiming device generally designated 10 comprising support vehicle 12 supporting a boom 14, at the end of which is mounted a reclaiming wheel 16. As is shown in FIGS. 2 to 5, the reclaiming wheel 16 is comprised of a first annular member 18 and a second annular member 20, both of which are mounted on axle 22. A number of scoops 24 are rigidly attached to annular member 20 and project both axially and radially beyond the periphery thereof. The scoops 24 are in the general form of a twisted rectangular plate, with the leading edge 26 inclined radially from a direction parallel to the axis of the wheel 16. An opening 28 is provided immediately forwarded of each scoop 24 along the direction of rotation of the wheel 16. As is illustrated in FIG. 3, as the wheel 16 rotates the scoops 24 direct the material to be reclaimed 30 through the openings 28 into the space between the annular members 18 and 20.

A flexible endless belt 32 extends between a motor driven pulley 34 and the reclaiming wheel 16. The belt 32 engages peripheral edges 33 and 35 on annular members 18 and 20 respectively so as to enclose the space between them around part of the periphery of the wheel 16. In operation, the wheel 16 is rotated at a speed sufficient to hold the material 30 against the inner side of the belt 32 by centrifugal force. At the point where the belt 32 separates from the wheel 16 the material 30 is no longer contained within the wheel 16, and is, therefore, thrown from it. Chutework 36 then directs the material 30 onto conveyor 38, which carries it away.

While the invention may be operated satisfactorily with the components described above, a plate 40 may be provided between the annular members 18 and 20 immediately in front of each opening 28 in the direction of rotation. The plates 40 augment friction between the material 30 and the other components in urging the material 30 to rotate with the wheel 16 and belt 32. The plates 40 also prevent material 30 that has come into the wheel 16 through one of the openings 28 from interfering with the entry of material through a following opening. In addition, the outer edges 44 of the plates 40 may be located to support the belt 32 across its width.

The plates 40 are inclined from a radial orientation, with the inner edge 42 of each plate 40 forward of the outer edge 44 in the direction of rotation. This inclination should be sufficient that, as the material 30 is thrown from the wheel 16, the portion of the material that had been adjacent to inner edge 42 will not be struck by outer edge 44. The desired degree of inclination of the plates 40 in any particular device will, of course, depend upon the desired speed of rotation.

Conventional bucket wheels are designed to rotate at no more than approximately one-half the rotational speed at which reclaimed material would be held in the device by centrifugal force. Prior practice has shown that the cutting members of such devices work satisfactorily, without undue wear, at the resulting linear speed through the material to be reclaimed. The scoops 24 of my invention will have the same linear speed as a conventional bucket wheel if the radius of the wheel 16 is one-half the radius of such a conventional bucket wheel and the rotational speed of the wheel 16 is twice the rotational speed of the conventional bucket wheel. Since centrifugal force varies linearly with the radius and as the square of the rotational speed, the rotational speed of such an embodiment would be approximately that required to operate as described above.

The smaller size and lighter weight of a reclaiming wheel made according to my invention, compared with a conventional bucket wheel of equal reclaiming rate, permits economies in the fabrication of the support vehicle 12 and boom 14. Less energy will be required to operate a reclaiming wheel made according to my invention because of its lighter weight and because the reclaimed material needs to be elevated a shorter distance.

In the embodiment described above the wheel 16 is driven by the motor driven pulley 34 through the coupling provided by belt 32. Different couplings could, of course, be utilized. For example, a motor could be coupled to the axle 22 by a second belt or by an arrangement of gears and shafts. However, this would add to the weight and complexity of the device. Further, the belt 32 engages the wheel 16 at its periphery, thus minimizing the torque required to drive pulley 34.

Figure 6:
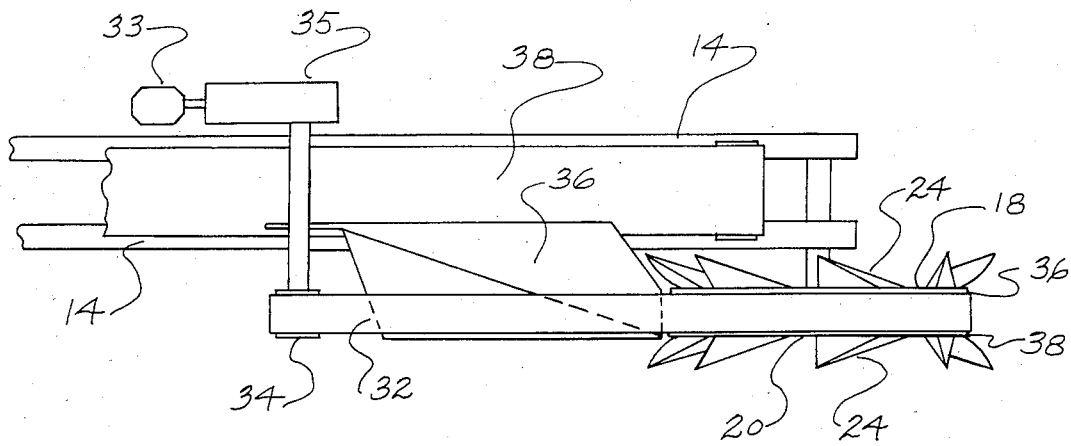
FIG. 6 is a plan view of a second embodiment of the reclaiming wheel, belt and drive motor as attached to the boom with the associated chutework and conveyor.

In operation, the wheel 16 is swept in a direction substantially parallel to its axis. It may be desirable to provide openings and scoops on annular member 18 similar to the openings 28 and scoops 24 on annular member 20, as is illustrated in FIG. 6. While this may cause some spillage, it will also permit material to be reclaimed while the wheel 16 is being swept in either direction. In many applications this will maximize the material that can be reclaimed in a given period of time.

FIG. 1 illustrates a support vehicle 12 that rests on rails. Various other support means could be utilized, such as a truck of the type described in U.S. Pat. No. 3,746,150. Many other changes and modifications in the above described embodiments of the invention can also be carried out without departing from the scope thereof.

I claim:
1. A reclaiming device comprising;
   a. a reclaiming wheel comprising an axle, a first annular member mounted on the axle, a second annular member mounted on the axle spaced apart from the first annular member and having a plurality of openings therein, and scoop means attached to the second annular member adjacent to at least one of said openings, said scoop means being configured to direct material to be reclaimed through the adjacent opening into the space between the first annular member and the second annular member;
   b. a flexible belt having one edge which engages the first annular member and a second edge which engages the second annular member around a part of the periphery of the wheel; and
   c. means for rotating the wheel about the axle at a speed sufficient for centrifugal force to hold the material that is to be reclaimed by the device against the segment of the flexible belt whose edges are engaged by the annular members.
2. A device according to claim 1 having a plurality of plates disposed between the first annular member and the second annular member so as to partition the space between the annular members.
3. A device according to claim 2 in which the outer edges of the plates are located so as to engage the flexible belt across its width.
4. A device according to claim 1 in which the means for rotating the wheel about the axle comprises the flexible belt and motor means coupled thereto.
5. A device according to claims 1, 2, 3 or 4 in which the first annular member has a plurality of openings therein, and scoop means attached to the first annular member adjacent to at least one of said openings, said scoop means being configured to direct material to be reclaimed through the adjacent opening into the space between the first annular member and the second annular member.

* * * * *